June 30, 1931.  J. OBERMILLER  1,812,548
METHOD OF PRODUCING A CONSTANT DEGREE OF HUMIDITY IN AIR OR OTHER GASES
Filed Aug. 22, 1923
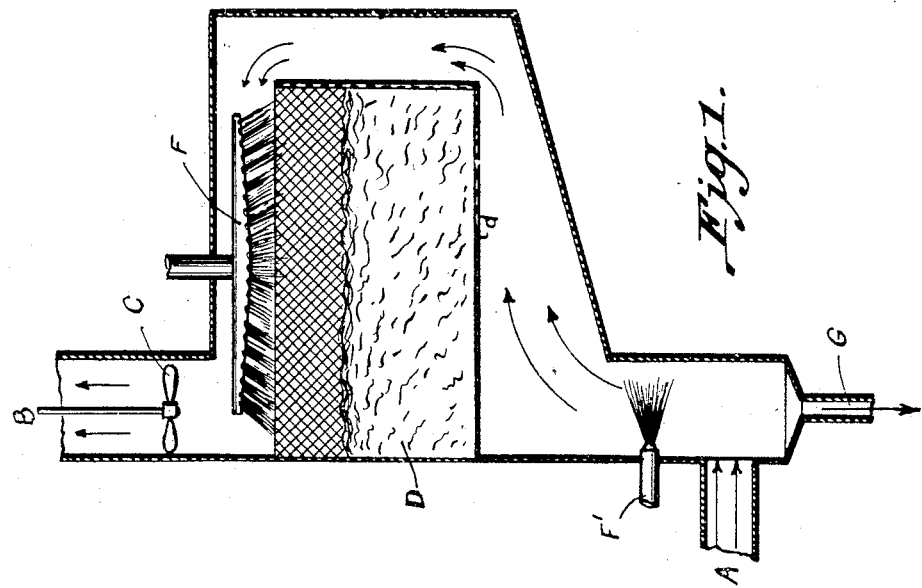
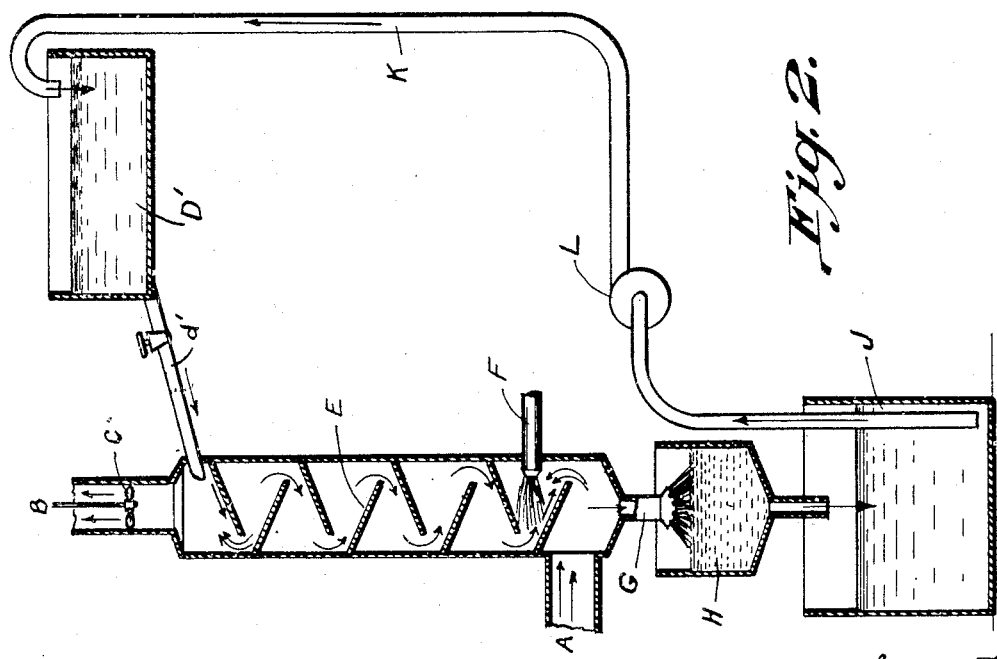

Patented June 30, 1931

1,812,548

UNITED STATES PATENT OFFICE

JULIUS OBERMILLER, OF MUNICH-GLADBACH, GERMANY

METHOD OF PRODUCING A CONSTANT DEGREE OF HUMIDITY IN AIR OR OTHER GASES

Application filed August 22, 1923, Serial No. 658,836, and in Germany August 22, 1922.

My invention relates to improvements in the method of producing a constant degree of humidity in air or other gas.

In many industries, for example in spinning mills, weaving plants, in the alimentary industry, and generally in the drying and fermentation industries, it is of the utmost importance to produce a definite and constant degree of humidity in air or other gas. As far as I am aware reliable methods of producing and maintaining an exact degree of humidity of air or gas are not known.

I have discovered that any desired degree of humidity can be produced and maintained by passing the air or gas through salts soluble in water or bodies of a similar character within a closed chamber and constantly keeping the said salts or other bodies wet, or by otherwise bringing the air or gas in contact with the said bodies. In this method the amount of water combined with the bodies may vary within broad limits, but the bodies should not be completely dissolved.

In the literature I have not found any information about exact experiments aiming at the production of the desired degree of humidity of air or other gas by means of wet salts or similar bodies. I am aware that it has heretofore been proposed to effect a change in the degree of humidity of air or gases by treatment with calcium chloride. It has been a question, however, of drying the air to the greatest possible degree and a rather inconstant low degree of humidity, arrived at from the moist side only, has been the only result achieved. In such processes it would be sought to avoid a known moisture content of the calcium chloride as injurious. I am further aware that it has been proposed to circulate air or other industrial gas through crystalline soluble bodies such as kitchen salt having a certain amount of a solvent supplied thereto for gradually dissolving the same. In this process the crystalline bodies have only the function of a filtering medium, and a definite degree of humidity of the air or gas was not aimed at, the object being merely to separate the dust and to avoid a choking of the filters. For this purpose the dust and other solid particles deposited on the wet crystals was made to drip off together with the solution produced by the gradually proceeding dissolution of the crystals, so that they were continuously washed out of the filter.

My improved process does not aim at the separation of dust, from air or other gas, nor at the production of an indefinite degree of humidity but at the production of any desired definite and exact degree of humidity of air or gas which originally shows a higher or lower degree of humidity.

The use of wet salts or substances having a similar function, in lieu of complete solutions of such basic substances, which do not contain such bodies in solid form is important, because the wet solid substances are adapted in a far more reliable way to bring the air or gas to the desired characteristic degree of humidity, than the solutions. The reason resides in the fact that the wet substances must be regarded as solutions of the highest possible concentration containing a maximum of the basic body. The basic body is coated with a minute layer of the solution which therefore presents a very large surface. Therefore by the said solution from air or gas the degree of humidity of which exceeds that corresponding to the equilibrium the excess of water is withdrawn at the highest velocity, whereupon a corresponding amount of the basic body is rapidly dissolved, so that the state of highest concentration is reestablished. On the other hand, if the air or gas is too dry, water is rapidly transmitted thereto, in which case a corresponding amount of the salt or other body is precipitated in solid form, so that also in this case the concentration remains constant.

In pure solutions, however, which do not contain the basic body in solid form, the process of maintaining the equilibrium will always be connected with a variation of the concentration, which results in a change of the degree of the humidity of the air or gas. If in this case the original humidity of the air or gas is higher than that corresponding to the equilibrium of the solution, the solution can take up the humidity from the air or gas only until it has been reduced to a degree of concentration which corresponds to the equilibrium of the original humidity of the air or gas. If, however, the original degree of the humidity of the air or gas is below that corresponding to the equilibrium, the solution can give off water only until its concentration has been raised to a definite degree, or until the water of the solution has been completely vaporized.

I have found that, instead of directly using salts or other substances which are kept in a wet state, the solution and the basic body may be separately used in a suitable way, and that the result is the same. In this case at first a highly concentrated solution of the salts of other substances is passed through the air or gas in the form of a thin layer or otherwise in a state of fine distribution, and thereafter the solution is circulated through the solid salt or other substance for maintaining the highest concentration of the solution, whereupon the circuit is closed and the solution is again brought into contact with the air or gas.

Furthermore I have discovered that, at any temperature—or at least within temperature limits which are not too broad—air or gas in contact with many wet substances of various kinds assume a relative humidity which in each case is nearly constant. Apparently, the change of the relative humidity which is ordinarily observed in a certain degree in case of a change of the temperature is primarily caused by the change of the solubility of the bodies in water connected with a change of temperature, which change is ordinarily very great.

As a matter of fact, the said dependence of the relative humidity, which as far as I am aware has heretofore not been observed, agrees with the values of the steam pressures of salt solutions of different concentrations at temperature of from 0 to 100 degrees C., which have heretofore been observed by others (see Landolt-Börnstein, Phys. Chem. Tabellen, fourth edition, 1912, pages 410 and following).

In view of this dependence of relative humidity upon the kind of wet substance used I am now enabled with a high degree of accuracy by selecting suitable wet substances, to produce the desired relative and therefore the absolute humidity of unlimited volumes of air or gas in a degree which has heretofore not been attained.

*Example.*—By numerous experiments made with highly dried and highly humid air I have found that in case of kitchen salt, the solubility of which in water is comparatively stable and substantially constant at any temperature, and which therefore must cause a relative humidity which varies in a very slight degree upon a change of temperature, the relative humidity of air produced above the wet salt from both directions is nearly 75% at a temperature of 18 degrees C. as well as at a temperature of 24 degrees C. Originally chemically pure kitchen salt has been used in the experiments, and thereafter kitchen salt which was less pure and kitchen salt of the trade, but any material departure from 75% has not been observed.

The said relative humidity of 75%, which without any doubt is at least very close to the true value, corresponds at a temperature of 18° C. to an absolute humidity of the air of 11.6 grammes per cubic meter and at a temperature of 24° C. to an absolute humidity of the air of 16.3 grammes per cubic meter.

In the same way for any other temperature the absolute humidity of the air above the kitchen salt can be calculated with a comparatively high degree of accuracy. At a temperature of 20° C. the absolute humidity of the air will be 13 grammes per cubic meter, and at a temperature of 30° C. the absolute humidity is 22.8 grammes per cubic meter.

To illustrate the degree of the relative humidity of the air found over wet substances of different kinds the following order shows substances producing a decreasing humidity of the air:

Potassium-sulphate, soda cryst., potassium-chlorid, ammonium-sulphate, sodium-chlorid (kitchen salt), ammonium-nitrate, calcium-nitrate, potash, calcium-chlorid, phosphoric acid cryst.

The water taken up by the solution can be evaporated for the purpose of recovering the basic body from the solution.

The accompanying drawings illustrate apparatus adapted to carry out the process according to my invention.

Fig. 1 shows an apparatus for the direct use of solid material, while

Fig. 2 shows an apparatus for the separate use of solid material and highly concentrated solution.

Referring to Fig. 1, the air enters at A and leaves at B, aided in its movement by the fan C. The solid material is placed in the container D, open at the top, whose perforated walls $d$ (of wire mesh, or the like) extend into the passage traversed by the air. The container D has one side wall in common with the air conduit so that the air is forced to take the path indicated by the arrows and comes into thorough contact with the solid material. A water rose F is arranged above the container D for the purpose of moistening the material in the latter when required. A spray-nozzle $F^1$ is arranged beneath the container D for moistening the incoming air when necessary.

The solution dripping from the container D is carried away by the conduit G.

In Fig. 2, as in Fig. 1, the air to be treated enters at A and leaves at B, moved by the fan C. The highly concentrated solution is contained in the reservoir $D^1$. From the reservoir the solution passes by means of pipe $d^1$ into a cylindrical container provided with sloping, overlapping baffles E, arranged alternatingly on opposite interior walls of the cointainer. The solution in a thin film thus traverses the container in a zig-zag course from top to bottom. For moistening the air, in case of necessity, a spray-nozzle F for water is again arranged somewhat above the point of air entry A. The solution leaves the container by the outlet tube G which is provided with a rose by means of which it is sprayed over the solid material contained in the funnel-shaped receptacle H. This solid material is the same as contained in the solution. After the solution has traversed the solid material and has thus been completely restored to its highly concentrated, saturated condition, it passes into the collector J from which, by means of pump L and conduit K it is returned to the reservoir $D^1$. The circuit then commences anew.

I claim:

1. The herein described process of producing a definite relative degree of humidity of air or other gas, which consists in bringing the air or gas into contact with a suitable wet salt-like body and supplying necessary additional moisture to said substance for maintaining it in a sufficient degree of wetness.

2. The herein described process of producing a definite relative degree of humidity of air or other gas, which consists in successively bringing the air or gas into contact with a highly concentrated solution of a suitable body soluble in water, and circulating the solution through a mass of the solid body.

3. The herein described process of producing a definite relative degree of humidity of air or other gas which consists in bringing a highly concentrated solution of a suitable body soluble in water and the air or other gas into contact and thereafter bringing the solution again to its original high concentration or volume, according to whether it has absorbed or lost water, by bringing it in contact with a mass of the water-soluble body, or adding moisture thereto, respectively.

4. The process of producing, independent of normal variations in temperature, a definite degree of relative humidity in air or other gas, which consists in selecting a substance, a saturated water solution of which will draw moisture from the gas if above such degree or add moisture to the gas if below such degree, bringing such saturated solution into contact with the gas and maintaining the saturation of the solution.

The foregoing specification signed this 21st day of July, 1923.

DR. JUL. OBERMILLER.